Figure 1:
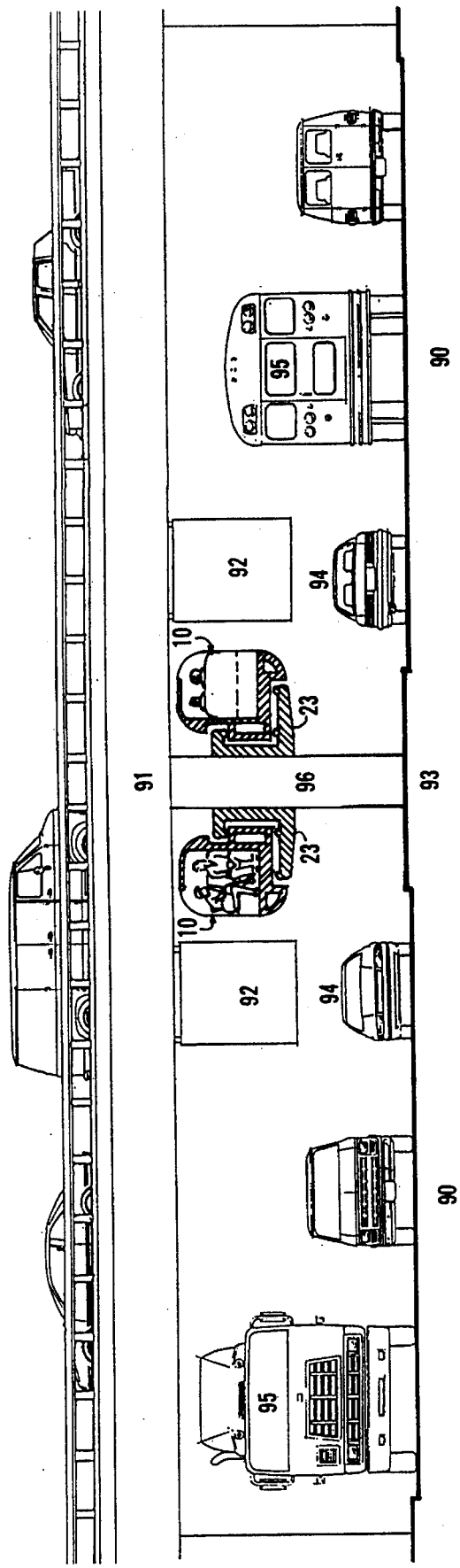

United States Patent [19]

Geldbaugh

[11] Patent Number: 5,456,183

[45] Date of Patent: Oct. 10, 1995

[54] INTEGRATED INFRASTRUCTURE TRANSIT SYSTEM

[76] Inventor: G. Richard Geldbaugh, 2600 Pualani Way #2905, Honolulu, Hi. 96815

[21] Appl. No.: 989,050

[22] Filed: Dec. 9, 1992

[51] Int. Cl.$^6$ ................................................ B61B 13/04
[52] U.S. Cl. .................... 104/121; 104/110; 104/124; 105/329.1; 295/7
[58] Field of Search ....................... 104/106, 110, 104/118, 121, 124; 105/141, 146, 147, 329.1, 331, 332; 238/134, 135, 143, 148, 150; 295/7

[56] References Cited

U.S. PATENT DOCUMENTS

| | | | |
|---|---|---|---|
| 1,339,046 | 12/1919 | Platten | 238/150 X |
| 1,431,536 | 1/1922 | Maloney . | |
| 1,982,043 | 11/1934 | Brownyer | 295/7 X |
| 3,122,105 | 2/1964 | Scherer | 104/121 X |
| 3,890,904 | 6/1975 | Edwards | 104/118 X |
| 3,924,450 | 3/1976 | Bordons Elorza | 104/121 |
| 3,985,081 | 10/1976 | Sullivan II | 104/118 X |
| 4,042,308 | 12/1976 | Freedman . | |
| 4,274,335 | 9/1979 | Boland | 104/93 |
| 4,503,778 | 1/1982 | Wilson | 104/124 X |
| 4,671,183 | 6/1987 | Fujita et al. | 104/118 X |
| 4,690,064 | 5/1986 | Owen | 104/124 X |

FOREIGN PATENT DOCUMENTS

| | | | |
|---|---|---|---|
| 2248183 | 5/1975 | France | 104/121 |

Primary Examiner—Robert J. Oberleitner
Assistant Examiner—S. Joseph Morano

[57] ABSTRACT

A transit system is provided for application within existing routes of travel infrastructures, travelling along the median strip and utilizing the air space over the median strip and above limited height roadway traffic and beneath overpasses and height limiting infrastructures. The transit vehicles are supported on or side mounted from trucks operating on an elevated structural beam trackway with a lower upwardly facing support surface, an upper downwardly facing support surface, and (on certain vehicles) an upper medially facing support surface. Variations of the structural beam mount under overpasses or along the ground surface, and are used in switching means for secondary trackways. The transit system's vertical dimension is reduced by the interrelationship of the trucks and structural beam trackway with the transit vehicles, and by placing the vehicle to the side of the structural beam and side supporting the vehicle from the trucks. When the vertical air space for operation is limited, the transit system's vertical dimension is further reduced by a transit vehicle configuration placing passengers in a seated position with head room equivalent to that of an automobile, while traveling and having access side walls and contiguous roof panels acting as a door system, opening in an upward arc for full standing head room for loading and unloading. The stations for the transit system are built along the route of the transit system, over the expressways, again utilizing the land and the airspace of existing expressway infrastructures.

15 Claims, 14 Drawing Sheets

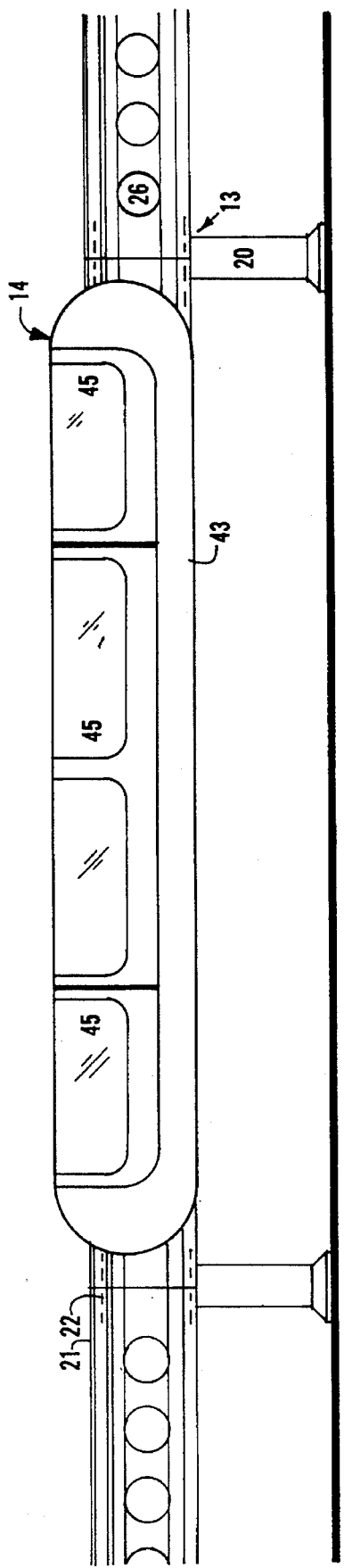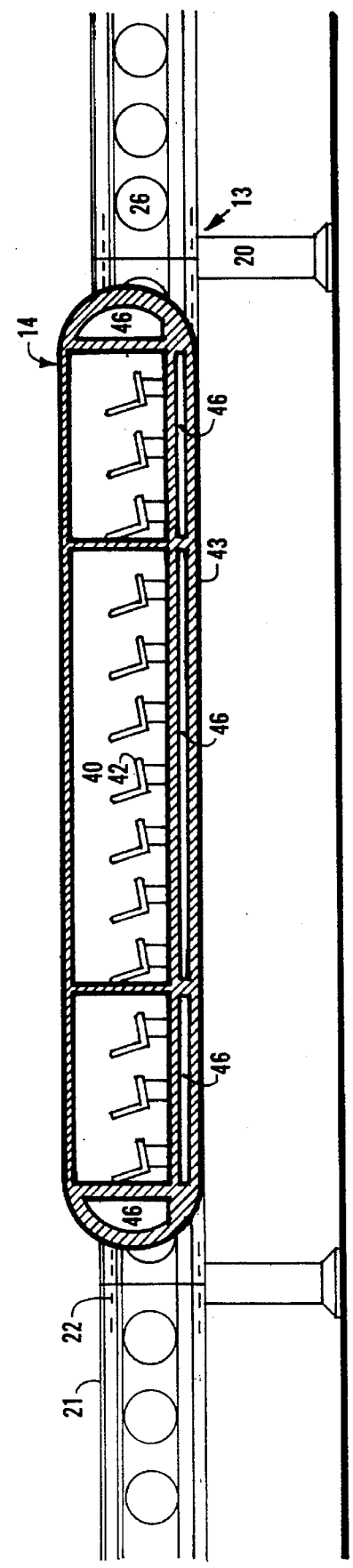
FIGURE 7A
FIGURE 7B

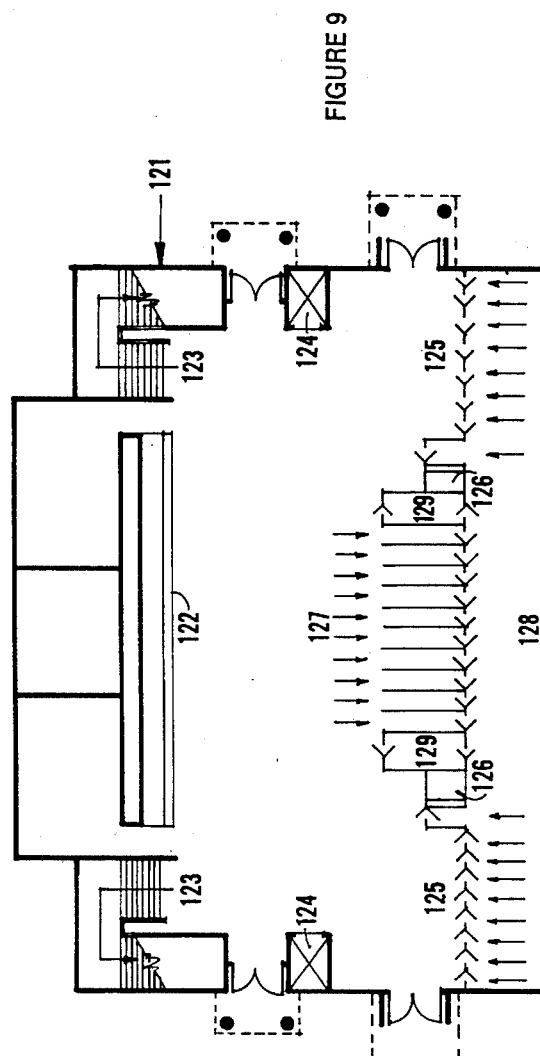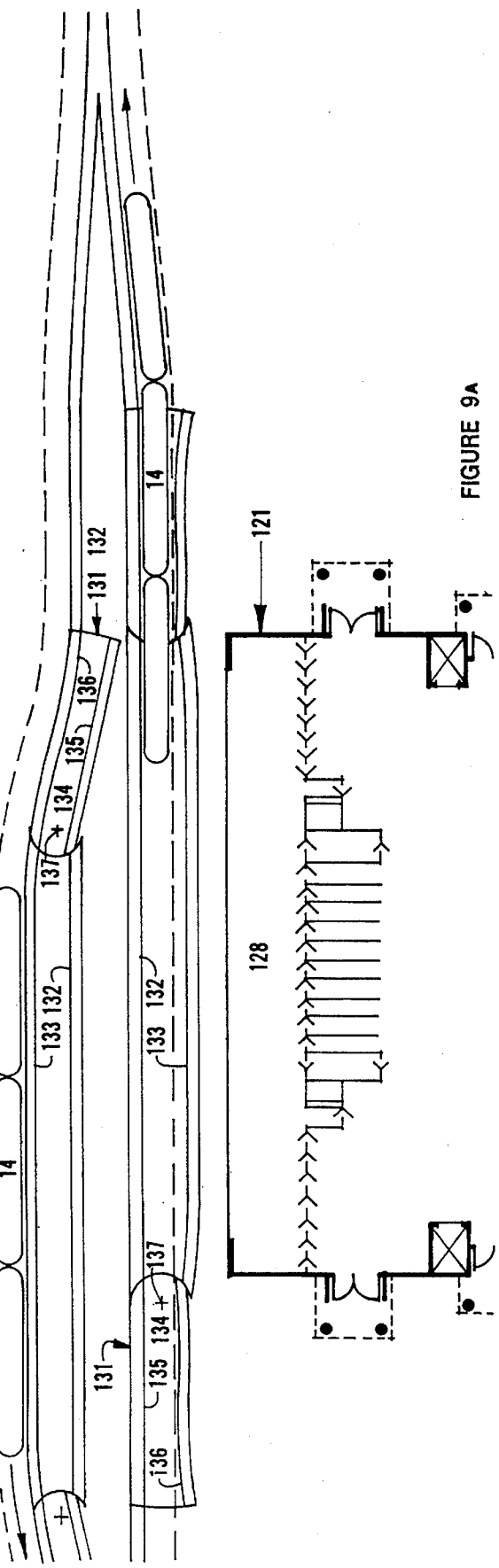

5,456,183

INTEGRATED INFRASTRUCTURE TRANSIT SYSTEM

BACKGROUND—OF THE FIELD OF INVENTION

This invention relates to transit systems, and specifically to elevated transit systems being incorporated into current suburban and urban infrastructures.

BACKGROUND—DESCRIPTION OF PRIOR ART

In recent years, interest in providing transit systems in urban and suburban areas has greatly increased as the demands on the auto used infrastructure has dramatically increased. The need for a efficient, cost effective transit system has not been met and the high cost of right-of-way land aquisition and construction for the transit structural system to interface with existing conditions are the primary reasons that the systems are not being built in dense urban areas.

U.S. patents relating to the transit concept are U.S. Pat. Nos. 1,431,536; 3,122,105; 4,042,308; 4,274,335; 4,503,778; and 4,690,064. Though pertinent to transit systems, these patents do not reconcile the problems of interfacing the transit structural system with existing conditions in urban and surburban areas.

In F. Durand's Demande de Brevet D'invention No. no. 73 37294 application, a mass transit system is described in which the transit vehicles are elevated on stems above the ground plane, and the bottom of the stems have trucks which run on a rail system at the ground level along the expressway. In order to resist the overturning moment forces of the vertically supported vehicle, a top guide rail is incorporated, necessitating the construction of a pier and beam system to support the top guide rail. The truck systems which run at the ground plane require a certain width in which to function, using space that is currently the emergency lane adjacent to the median in urban areas where the median strip is extremely narrow. Also in many congested urban areas, the overpass structures were built with a minimum span, even eliminating the emergency pullover lanes under the overpass. Therefore, incorporation of trucks on rails on the ground plane would encroach upon travel lanes and reduce the traffic volume the highways could accommodate. The truck systems are also limited in their flexibility of how they relate to the ground plane, and in areas where the median strip would be wide enough to accommodate mass transit vehicles at the ground plane, the system on stems would not be able to capitalize on eliminating the elevated superstructure. Also, in conditions Where it may be advantageous to have mass transit pass over the top of other infrastructures, the stem configuration would require a very large superstructure, not only to provide height for the bottom bearing trucks over the height of the other infrastructure, but also to provide additional height for elevated structures to support the top stabilizing rails. The same situation of massive vertical structures would occur whenever the stem system would be required to rise vertically as in approaching a station platform above the plane of the vehicle. By having the stations service the cars at the fixed level the stemmed cars normally operate, a wide median area would be required in order to accommodate the loading platforms. The invention application deals more with servicing of the vehicles and the turning of the vehicles than it does with integrating the vehicles into an existing infrastructure. In addition, the switching of vehicles to different tracks is very complicated when the vehicles are elevated on stems. The invention application does not address the limited height of the air space and acknowledge the vital height limitations of the transit vehicles imposed by the majority of older existing overpass infrastructures.

In the Owens U.S. Pat. No. 4,690,064 a side mounted monorail transportation system is shown offering a side mounted monorail with a conventional type transit vehicle configuration being suspended from a side mounted truck. The concept does not address the use of and/or is not configured to use a compacted vertical air space.

Conventional systems suffer from being too costly, too environmentally intrusive, visually cumbersome, plagued with noise and vibration due to the contact of metal wheels on metal rails, and are underutilized as a result of inconvenience of stations, routes, scheduling, and uncomfortable crowding of people within the passenger compartments. In addition, current railway systems are often built to an overcapacity condition, but then underutilized, resulting in deficit operation. Compounding this problem, the heavy infrastructures supporting most conventional rail systems are usually permanent and therefore cannot be altered to meet changing transportation needs. As a result, these inconvenient and therefore underutilized, intrusive, expensive transit systems are often resisted in both the legislature and in the public forum. An alternative system, which identifies and answers these issues would be a system designed to lessen the negative visual, noise, and environmental impact on the community, increase the frequency in scheduled routes, increase the comfort of the passengers in the vehicle, decrease the size of the supporting structure, with a flexibility for changing needs, place the system in existing right of ways thereby lessening the cost of additional land acquisition, and decrease the overall costs of the fabrication, erection, operation, and maintenance of the transit system. The present invention addresses all of these issues, thereby improving the system and simultaneously lessening the system's costs.

SUMMARY OF THE INVENTION—Objects and Advantages

The preferred embodiment of the present invention includes many advantages over existing transit systems. The system's uniqueness is best characterized in its comprehensiveness, as it integrates structure, truck systems, and vehicles into a complete system utilizing the air space along routes of travel, and passing under any existing infrastructure such as expressway overpasses. The present invention of a transit system is designed to have a light structural track system carrying lightweight vehicles which operate at a greater rate of frequency. The less in size/more often used transit concept makes possible smaller stations, smaller, energy efficient equipment, a smaller structural system, more flexibility, more diversity, lower cost, construction ease and less negative community impact. In addition, time factors, the costs of land acquistion, construction, maintenance and operation, and negative community impact are all greatly reduced by placing the transit system into the existing public utility and transportation infrastructure and airspace. The present invention accomplishes these advantages by means of:

a) The stations being positioned over the routes of travel, such as expressways, thereby utilizing existing public right-of-ways and placing the stations within the direct pathway of the transit system, and providing convenient access to the system.

b) The structural support system of the preferred embodiment is is comparatively smaller and lighter than conventional support systems, still having a depth to allow long spans between piers, with the support piers themselves being shorter, as the bottom of the strucutral support beam is only required to clear automobile type traffic. In addition, installation costs are also low in that the precast shapes allow for installation which is quick and easy, as a portion of the existing roadway can be used as the onsite installation grounds.

c) The transit vehicles being designed to be lightweight and of a compact height to minimize the loading imposed on the beam and allowing for the positioning of the entire system within the median strip of the expressway. The vehicles' interiors are compacted in height to that equivalent to an automobile's interior height for travel under existing overpass infrastructures, placing the passengers in a seated position while traveling. Comfortable loading and unloading is offered by upwardly arcing door sytems, allowing standing head room height while entering and exiting the vehicles. This direct walk-in access to the seating areas eliminates the need for aisleways within the vehicles, thereby reducing both the vehicles' width and weight, allowing the system be of a lightweight, compact configuration.

d) The trucks being designed to distribute their load close to the central web of the beam with the weight of the mechanical systems bearing on the trucks. Noise and vibration dampening means are used both within the wheel configuration and on the surfacing of the rails in the trackway to reduce the noise level of the overall system. A comfortable ride is offered by a unique double arm suspension means. A uniquely large wheel assembly offers greater traction and a smoother, quieter ride by distributing force over a larger bearing surface area as well as allowing high vehicle speeds while maintaining lower axle speeds, reducing wear and maintenance on rolling stock and allowing for the use of smaller, lighter, more efficient and economical motors with a lower gear ratio to provide the required operational torque.

e) Operational costs being reduced in this system, due to the system operating essentially from an automated program, without need of large staffing. The transit system is provided with features such as offboard computer equipment located at an external control center; an onboard optical scanner to read barcodes on the track; onboard barcodes to be read by track mounted optical scanners which are connected to the control system and onboard computer equipment and to the offboard external control center; and all necessary controls for manual control override of the transit vehicles may also be provided for onboard operator operation. Also the small, efficient vehicles use less power than currently operating systems.

f) Maintenance costs being minimized as the trucks and the vehicle are quickly and easily detachable from the trucks and have interchangable components. Also, ease of servicing is created by having the track system paralleling the exiting routes of travel allowing specialized service vehicles to gain direct access to the system by parking along the travel route, for example, in the median emergency lane of expressway.

The principles of the present invention are further discussed in the description which follows, with references made to accompanying drawing figures. The drawings are intended to be representational and thereby only exemplify, rather than limit, aspects of the invention as defined in the claims.

DRAWING FIGURES

FIG. 1 shows an expressway section incorporating the transit system

Figure 2:
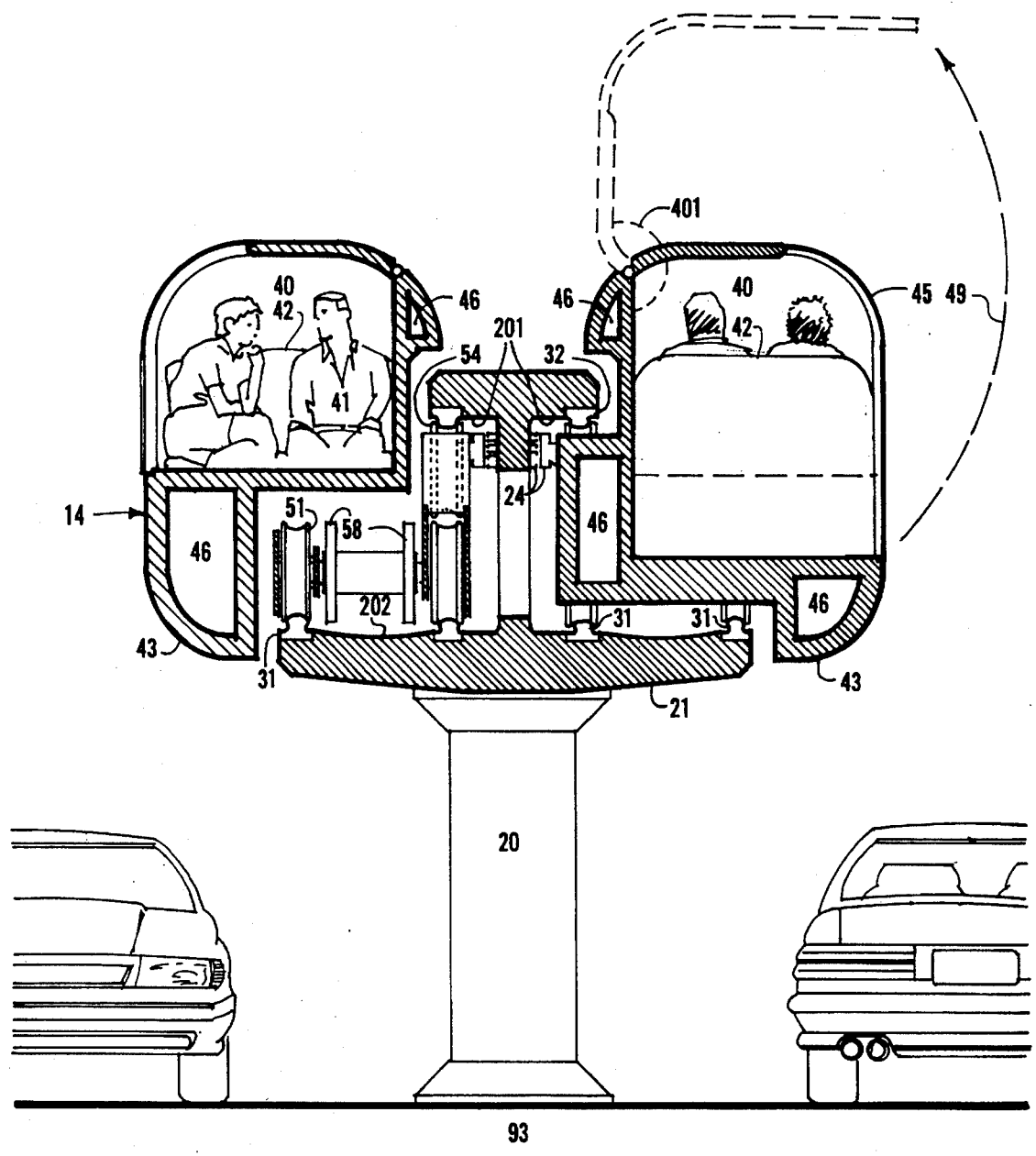
Figure 3:
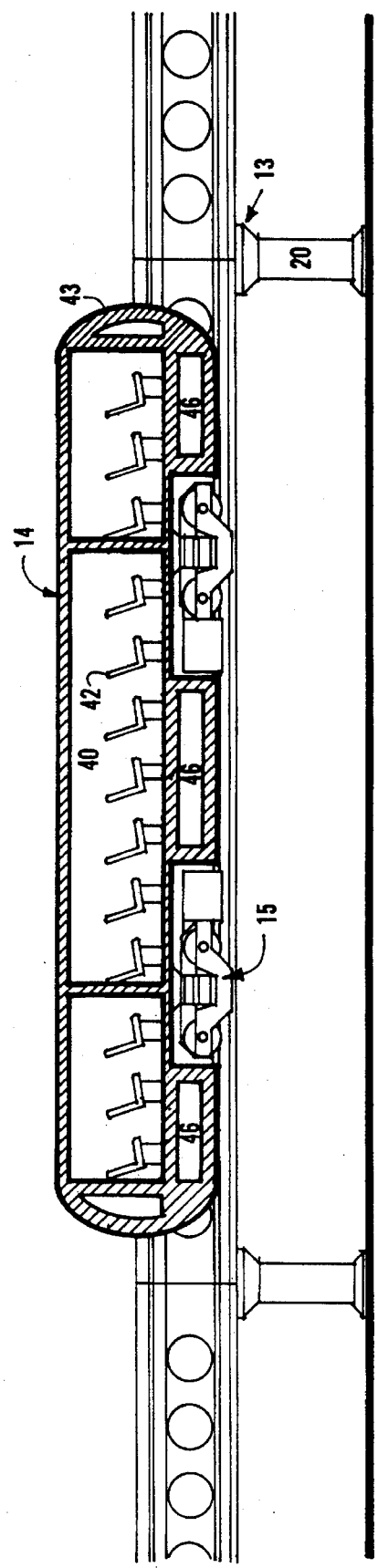
Figure 3A:
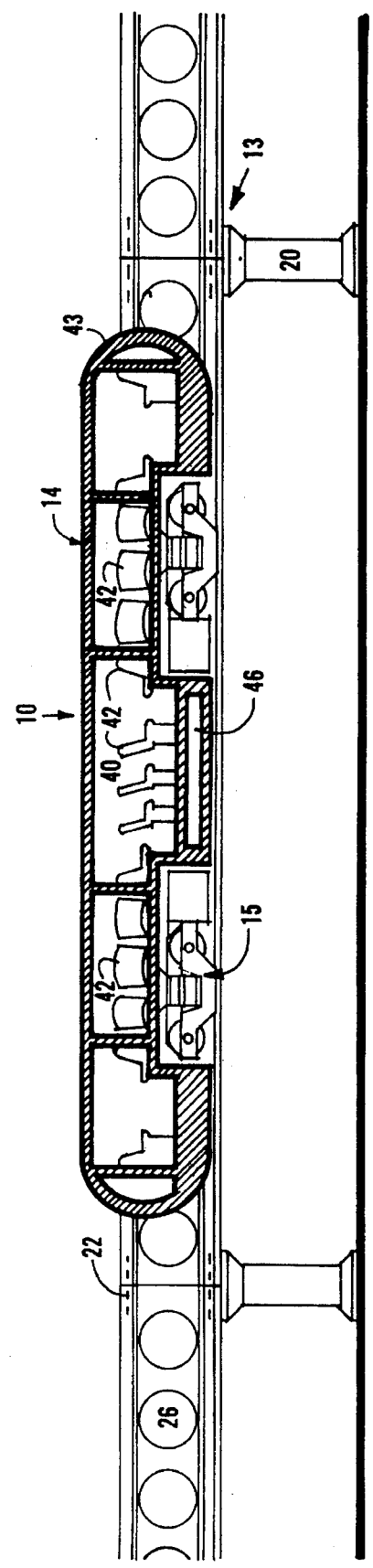
Figure 4:
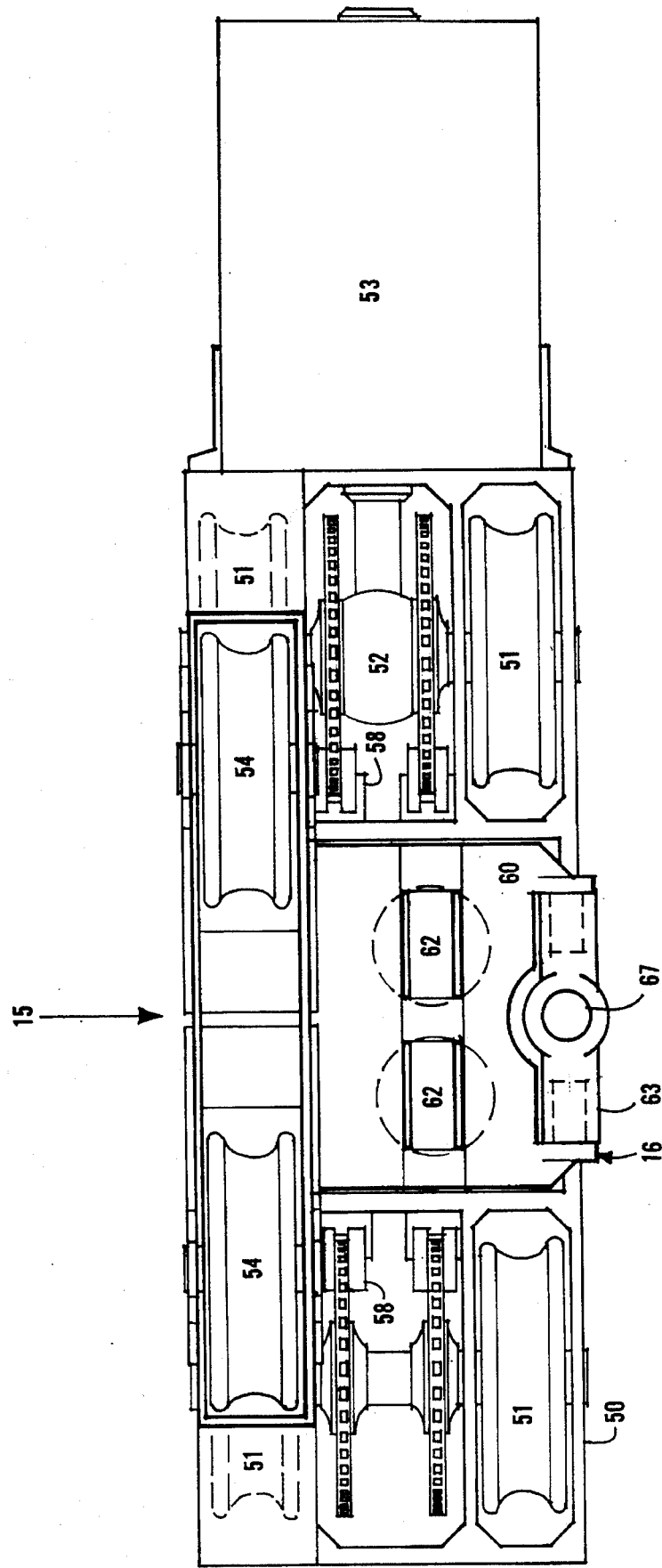
Figure 4A:
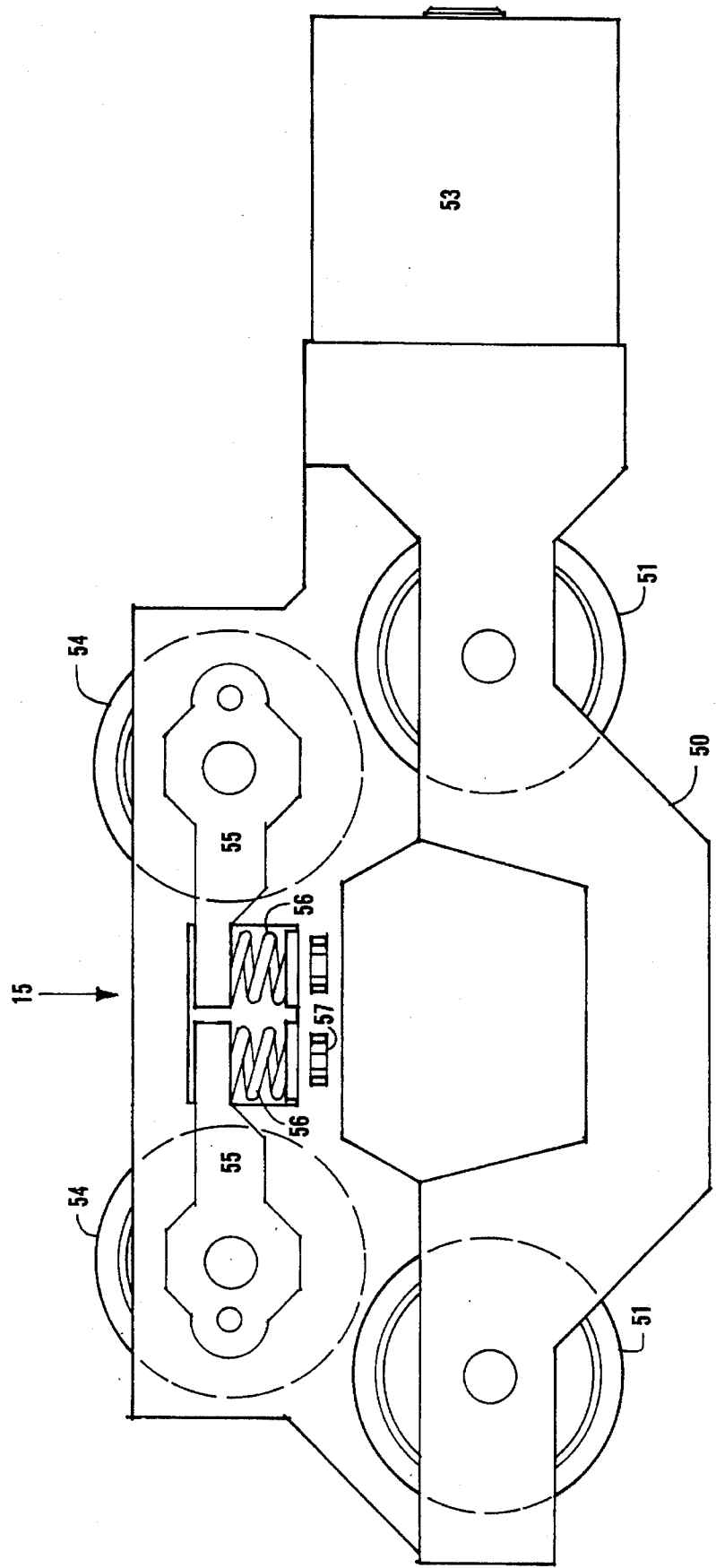
Figure 4B:
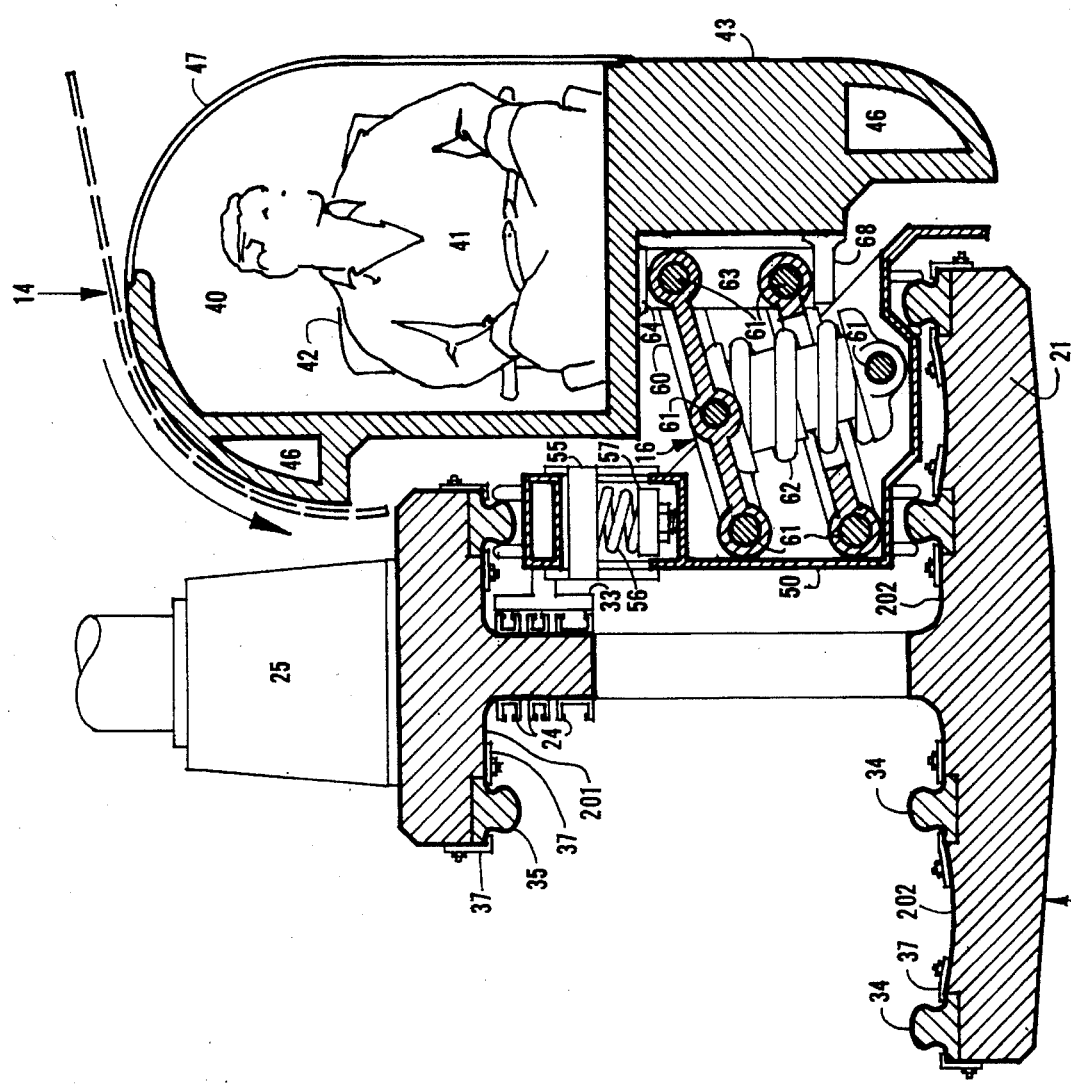
Figure 5:
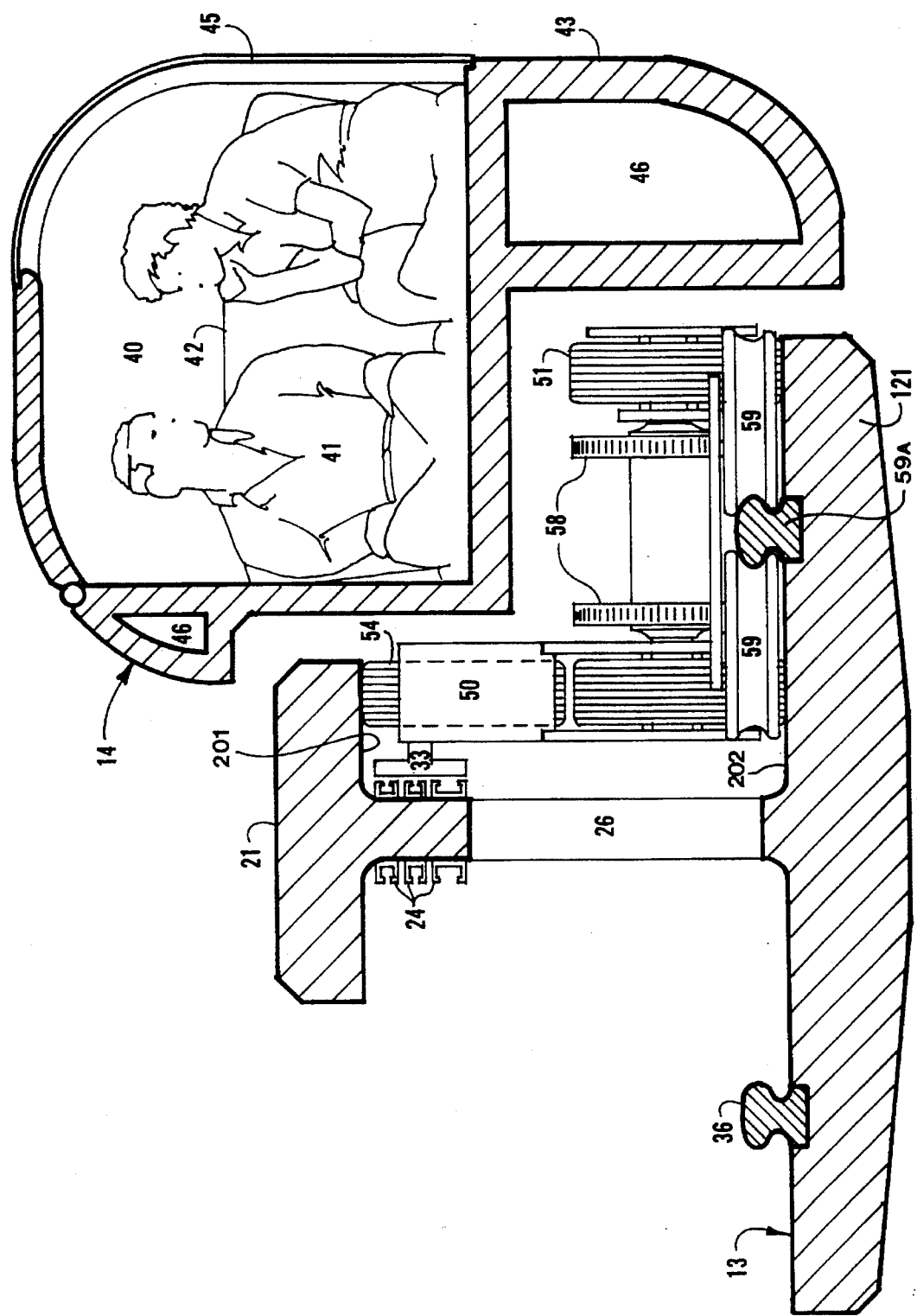
Figure 6:
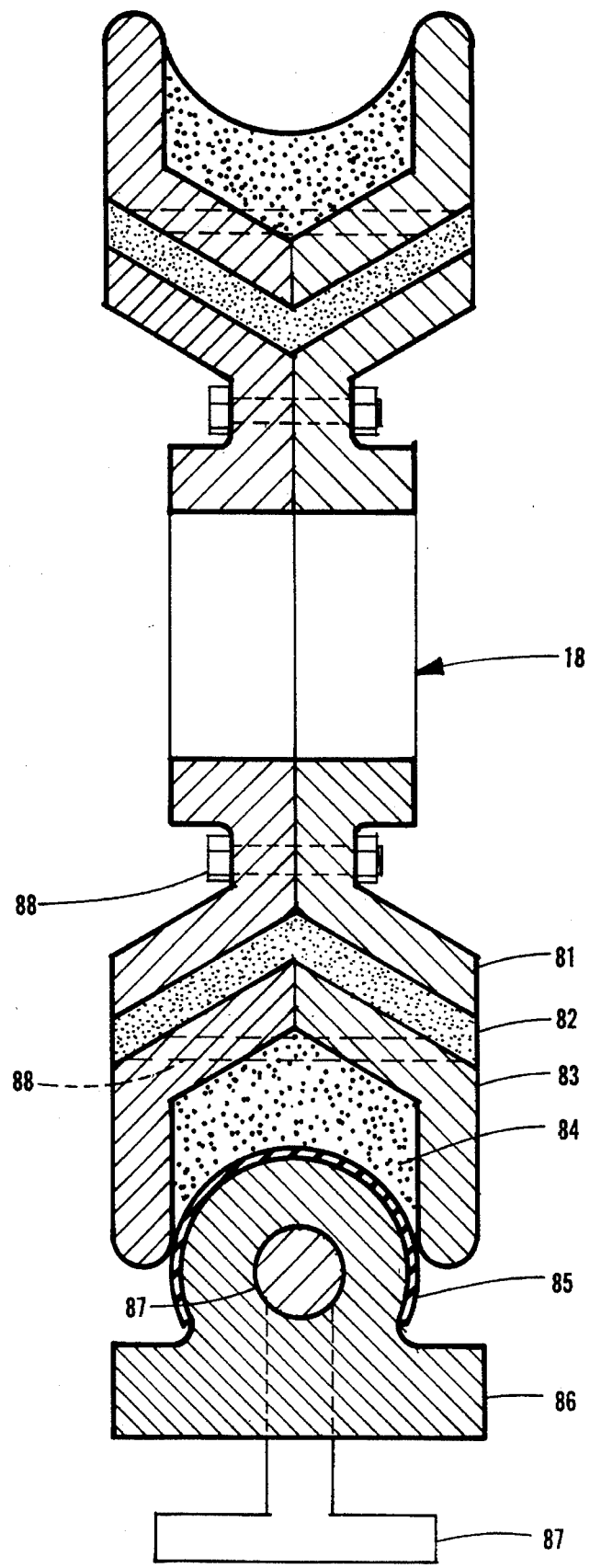
Figure 6A:
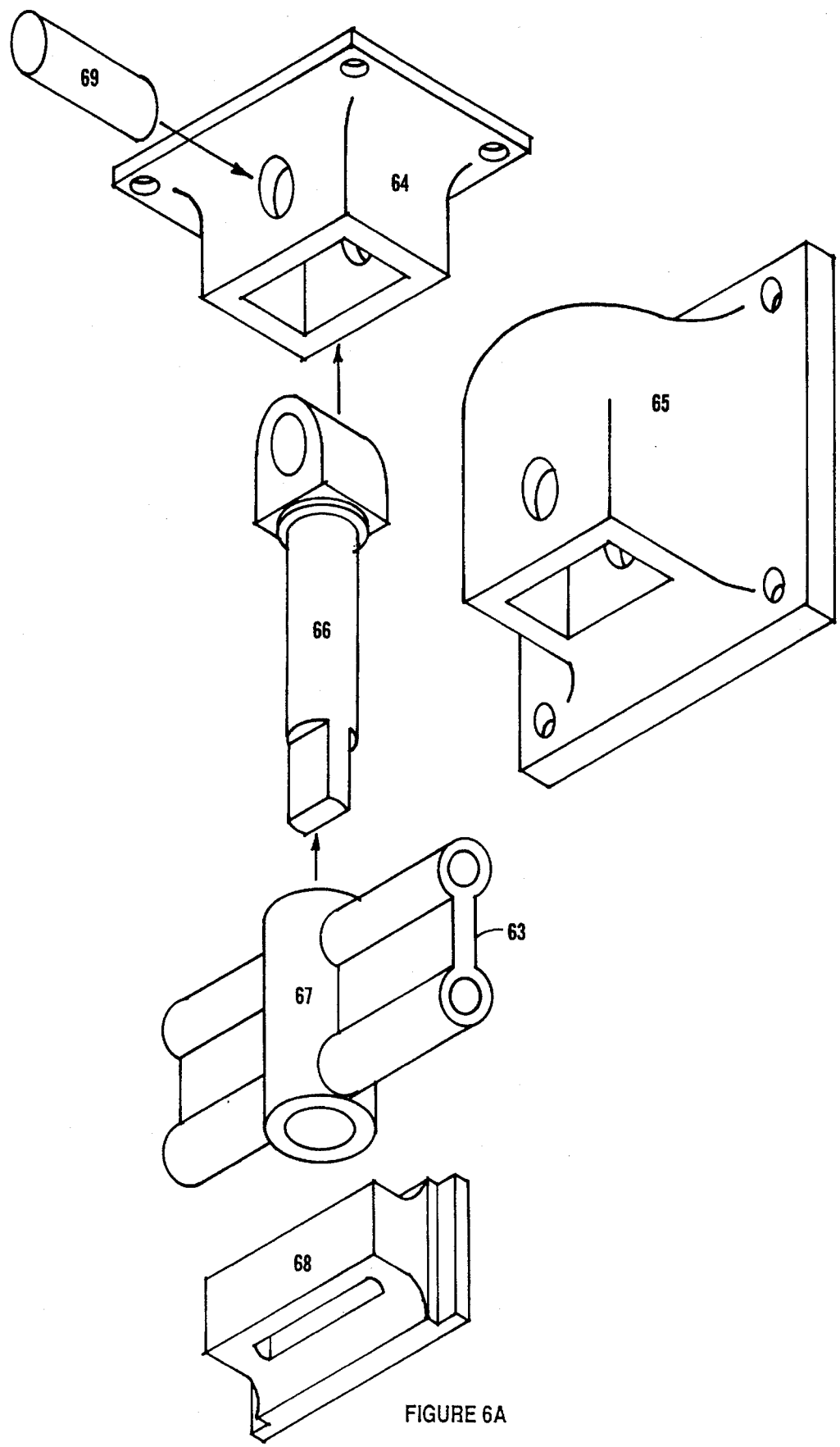
Figure 7:
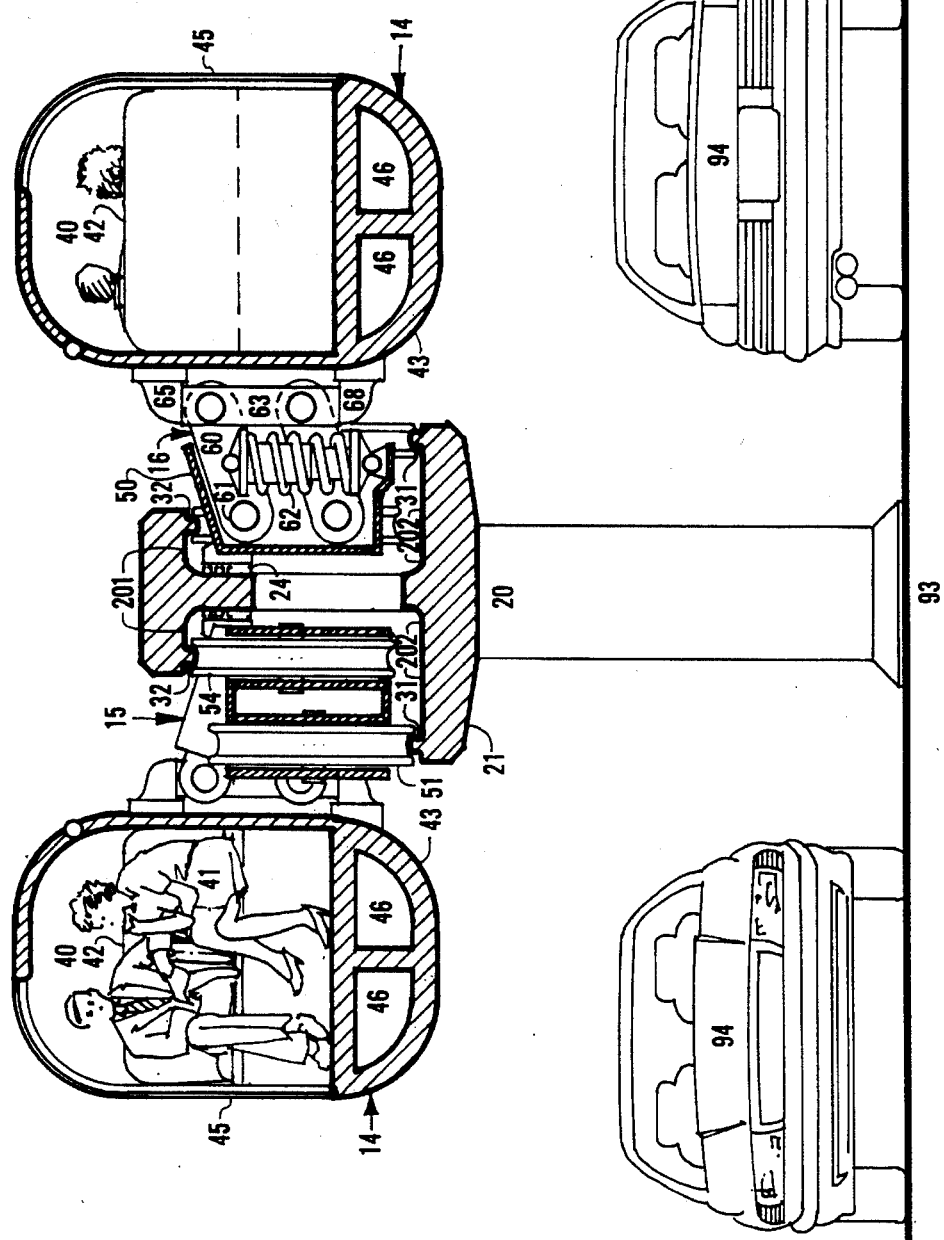
Figure 7C:
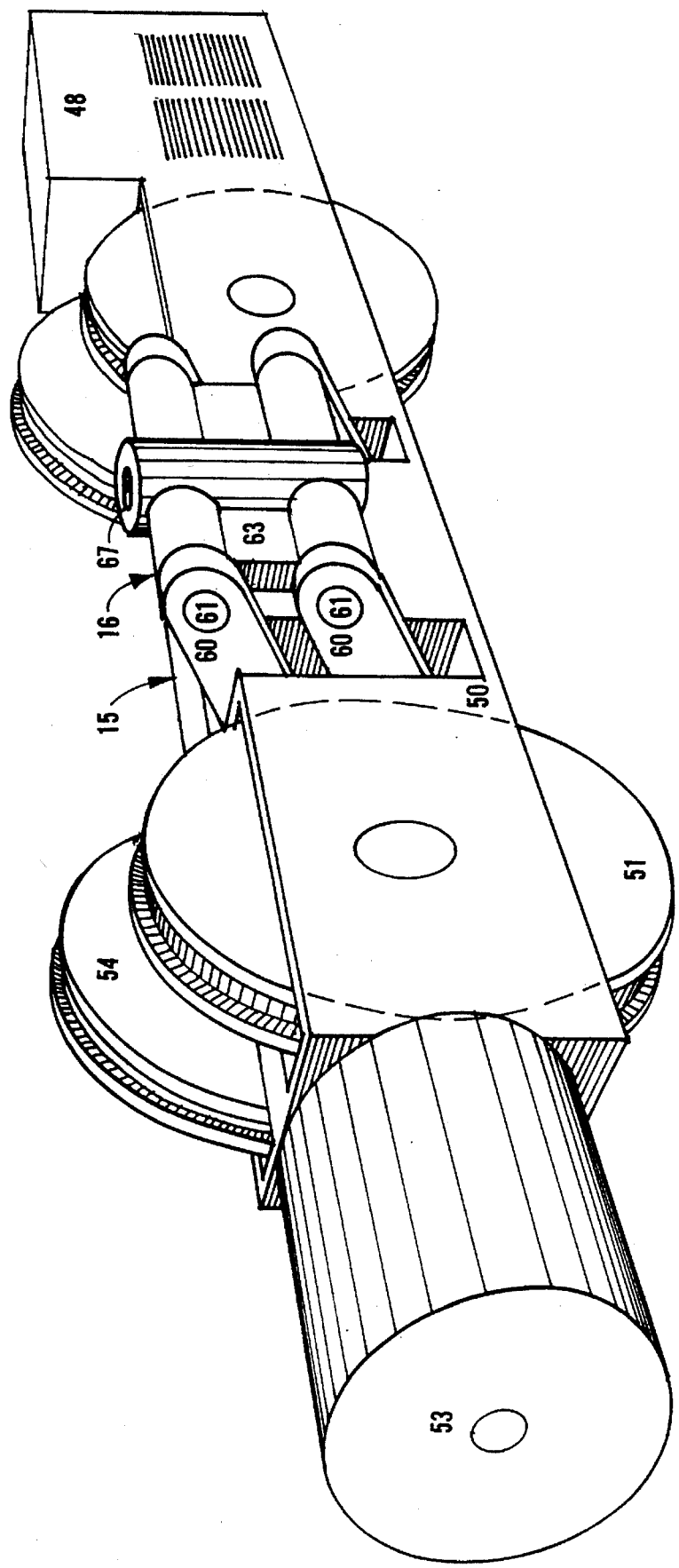
Figure 8:
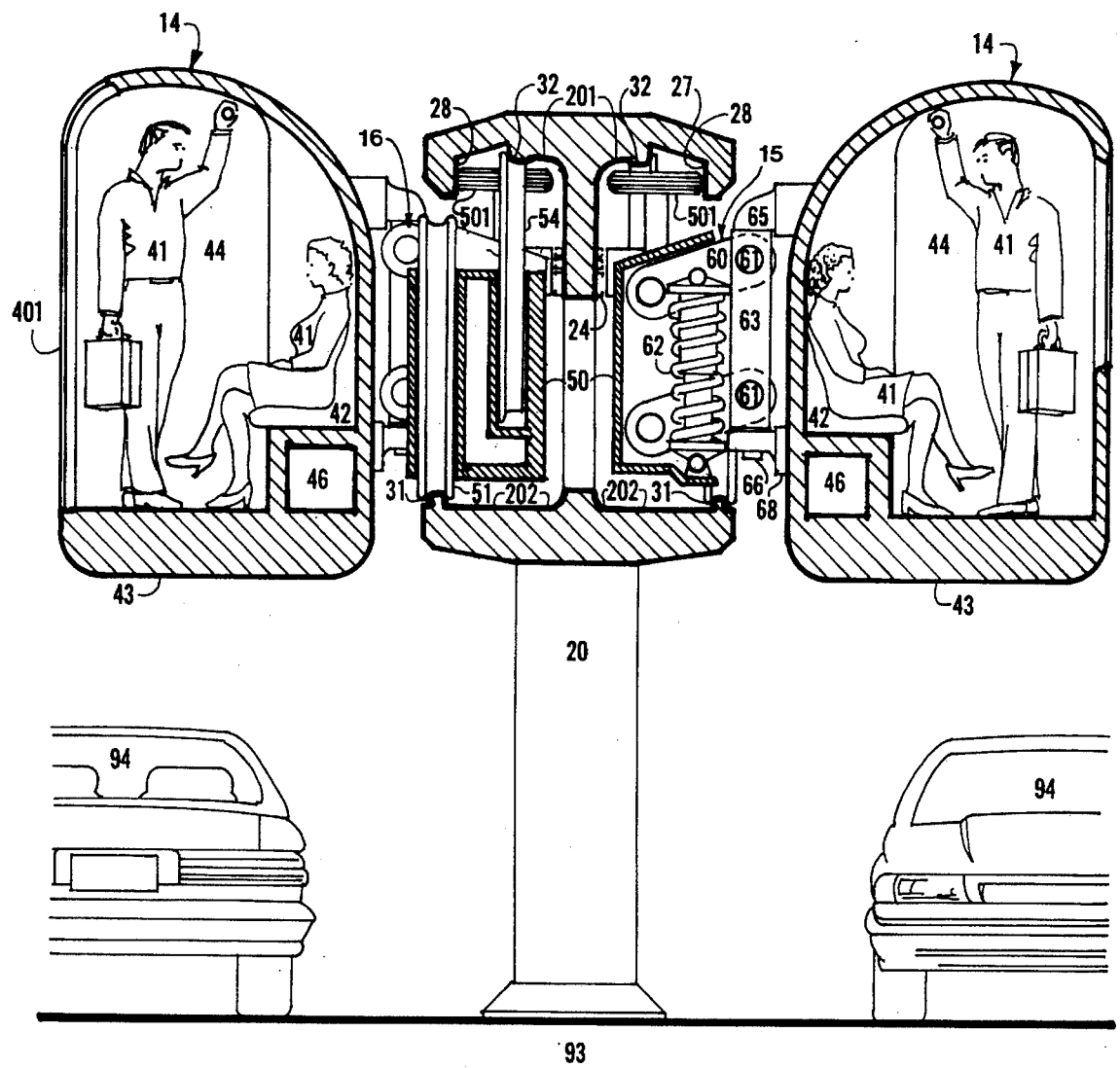

FIG. 2 shows a cross section through the transit system and the action of the door system FIG. 3 shows a truck integrated into the space of the vehicle frame FIG. 3a shows a truck integrated into the space of the vehicle frame and the passenger compartment FIG. 4 shows a plan section of the truck FIG. 4a shows an elevation of the truck FIG. 4b shows a section of the truck and the suspension system with a narrow transit vehicle FIG. 5 shows a cross section of the transit system with the guide rail means FIG. 6 shows a cross section of the wheel assembly and the composite rail assembly FIG. 6a shows an exploded view of the vertical connector pin assembly FIG. 7 shows a cross section of the side mounted truck and a cantilevered vehicle FIG. 7a shows a side elevation of the side mounted truck assembly FIG. 7b shows a section of a side mounted truck assembly FIG. 7c shows a perspective of truck in the side mounted assembly FIG. 8 shows a cross section of the full head room vehicle FIG. 9 shows a plan of the transit station and switching means FIG. 9a shows, fragmentarily, a mirror image of the transit station shown in FIG. 9 for servicing the side of the transit system remote from the transit station shown in FIG. 9.

DESCRIPTION—FIGS.

FIG. 1 shows a version of the transit system 10 in operation at an existing expressway overpass 90 where one half of the structural wide flange beam 23 is mounted to the sides of the overpass structural supports 96 of the median strip 93 of the expressway 90. Signage 92 is mounted on expressway overpasses 91. The system is shown with its direction of travel matching that of the traffic flow of road travel automobiles 94 and large vehicles 95.

FIG. 2 shows a cross sectional view of a version of the transit system mounted on the median strip center of the expressway 90 with the transit vehicle 14 running on a structural wide flange beam with extended base flange 21 supported by piers 20. The rolling stock shown here is comprised of a set of second wheel means (power and carrier wheels and axles) 51 which yieldingly bear downward on bearing rails 31 which are integrally cast into the top surface of the extended base flange of the structural wide flange beam 21, forming second track surface 202, and a set of first wheel means (vertical bearing stabilizing wheels) 54 which bear upwards on stabilizing rails 32 which are integrally cast into the underside of the head flange of the structural wide flange beam 21, forming first track surface 201. A power and communications means 24 is mounted to the structural wide flange beam 21. A brake assembly 58 is shown mounted to the second wheel means (power and carrier wheels and axles) 51. The transit vehicle 14 shown is comprised of the vehicle frame 43, constructed with mechanical space for hydraulics and climate control 46, to which are mounted passenger seats 42 and vertical arc door systems 45 which open upward along the path of travel 49.

FIG. 3 shows a sectional view of a version of the transit vehicle 14 where the truck system 15 is integrated into the space of the vehicle frame 43, supported by the track system 12 and support piers 20. In this configuration, all seats face forward in the direction of travel. The transit vehicle 14 is comprised of the vehicle frame 43, constructed with mechanical space for climate control and hydraulics 46, to which are mounted passenger seats 42 in the transit compartment 40.

FIG. 3A shows a sectional view of a version of the transit vehicle 14 where the truck system 15 is integrated into the space of the vehicle frame 43 as well as the transit compartment 40. In this configuration, the truck system 15 is located in the space under some passenger seats 42. The seats located over the truck system 15 are turned sideways. The transit vehicle 14 is comprised of the vehicle frame 43, constructed with mechanical space for climate control and hydraulics 46, to which are mounted passenger seats 42 in the passenger compartment 40, and runs on rails mounted in the track system 13. Track sections, constructed with voids 26, are connected with aligning pins 22 at each end, and are supported by piers 20.

FIG. 4 shows a plan view of a version of the truck system 15 which is comprised of 3 components: a truck carriage system 50 into which are mounted the rolling stock including (lower carrier and power wheels and axles) 51, second wheel means (upper vertical bearing stabilizing wheels and axles) 54, and brake assembly 58; a drive train system including electric motor, clutch, and torque converter 53 connected to a power drive train 52; a suspension system 16 including suspension arms 60 connected to coil spring and dampening shock means 62, and connected to connector housing 63 with connector sleeve 67. (See FIG. 4B for a more detailed view of the suspension system 16).

FIG. 4A shows an elevation view of a version of the truck system 15 illustrating: the truck carriage system 50, the rolling stock including lower second wheel means (power wheels and axles) 51, upper vertical bearing first wheel means (stabilizing wheel and axles) 54, drive train system including electric motor, clutch and torque converter 53, stabilizing wheel tension pivot arms 55, stabilizing wheel tension springs 56, and stabilizing wheel tension adjustors 57, connected to the top and bottom of stabilizing wheel tension springs 56, respectively.

FIG. 4B shows a cross sectional view of a version of the transit system illustrating 3 components: the track system 13 including the structural wide flange beam with extended base flange 21, with metal bearing rails 34 mounted on the top surface of the extended base flange of the structural wide flange beam 21, forming second track surface 202, and metal stabilizing rails 35 mounted on the underside of the head flange of the structural wide flange beam 21 via connector means 37, forming first track surface 201, power and communication means 24 mounted to the wide flange beam 21, and a mounting surface for supports for signs and lights 25; truck carriage system 50, onto which is mounted suspension system 16 via pivot connecting means 61 on the bottom end of coil spring and dampening shock means 62 and on one end of suspension arms 60 which connect to the top end of the coil spring and dampening shock means 62 at their midpoint via pivot connecting means 61 and are attached at their other ends via pivot connecting means 61 to a connector housing 63 which is attached to a top mounting block vertical mount 64, and a bottom mounting block 68 (see FIG. 6A for a more detailed veiw of this connection); the transit vehicle 14 comprised of a vehicle frame 43 which is constructed with mechanical space for climate control and hydraulics 46, onto which are mounted a vertical sliding door system 47 and passenger seat 42 to form the transit vehicle compartment 40.

FIG. 5 shows a cross sectional view of a version of the transit system illustrating 3 components: the track system 13, including a structural wide flange beam with extended base flange 21 onto which bears the rolling stock on first track surface 201 located on the underside of the head flange, and second track surface 202, located on the top surface of the extended base flange into which guide rails 36 are integrally cast, and with a central vertical web onto which power and communication means 24 are mounted and into which voids 26 are cast; the rolling stock including second wheel means (carrier and power wheels and axles) 51, first wheel means (vertical bearing stabilizing wheels and axles) 54, and third wheel means (guide wheels) 59 which rollingly engage opposite sides of a guide rail 59a mounted on surface 202 and are mounted in a truck carriage system 50, with a brake assembly 58 mounted to second wheel means (carrier and power wheels and axles) 51, and power takeoff means 33 mounted to the truck carriage system 50; the transit vehicle 14, comprised of the vehicle frame 43 constructed with mechanical space for climate control ducts and hydraulics 46 onto which are mounted vertical arc door system 45 and passenger seats 42 creating the transit compartment 40.

FIG. 6 shows a cross sectional view of a modified wheel assembly 18 which is comprised of a split inner wheel assembly 81 held together with connecting means 88, onto which are mounted the vibration dampening component 82 and a split outer wheel assembly 83 which is held together by connector means 88, onto which is mounted a friction and noise dampening component 84. A modified composite rail shown incorporates a center core rod and anchorage bar 87 around which is of a cast non-metallic material 86, partially encased by noncorrosive electrically conductive cladding 85.

FIG. 6A shows an exploded view of a version of the vertical connector pin assembly, comprised of the top mounting block vertical mount 64 or horizontal mount 65 into which seats a vertical connector pin 66 which is connected by top pivot pin 69 and inserted into the connector sleeve 67 of connector housing 63 and bottom mounting block 68.

FIG. 7 shows a cross sectional view of a version of the transit system with a side mounted truck and transit vehicle mounted on the median strip center of the expressway 93 with the transit vehicle 14 running on a structural wide flange beam with extended base flange 21 supported by piers 20. The rolling stock shown here is comprised of a set of second wheel means (power and carrier wheels and axles) 51 which bear downward on bearing rails 31 integrally cast into the top surface of the extended base flange of the structural wide flange beam 21 forming second track surface 202, and a set first wheel means (vertical bearing stabilizing wheels) 54 which bear upwards on stabilizing rails 32 integrally cast in the structural beam, forming the first track surface 201 on the underside of the head flange of the structural wide flange beam 21. A power and communications means 24 is mounted to the structural wide flange beam 21. The rolling stock is mounted in the truck system 15 which is comprised of a truck carriage system 50, onto which is mounted suspension system 16 via pivot connecting means 61 on the bottom end of coil spring and dampening shock means 62 and on one end of suspension arms 60 which connect to the top end of the coil spring and dampening shock means 62 at their midpoint via pivot connecting means 61 and are attached at their other ends via pivot connecting means 61 to connector housing 63 which is attached to top mounting block horizontal mount 65, and bottom mounting block 68 (see FIG. 6A for a more detailed veiw of this connection), which are mounted to the transit vehicle 14 comprised of a vehicle frame 43 which is constructed with mechanical space for climate control and hydraulics 46, onto which are mounted vertical arc door system 45 and passenger seats 42 forming the transit compartment 40. The transit system is shown here running in the same diection of travel as the road travel automobiles 94.

FIG. 7A and 7B show a version of the transit system with a side mounted truck and vehicle supported by track sytem 13 and piers 20. Track system 13 is comprised of structural wide flange beams with an extended base flange 21 constructed with voids 26 and connected at the ends with aligning pins 22, supporting the transit vehicle 14 comprised of the vehicle frame 43 constructed with mechanical space for climate contral ducts and hydraulics 46 (shown in FIG. 4B) and vertical arc door system 45 (shown in FIG. 7A) forming the passenger compartment 40. In this configuration, all seats face forward in the direction of travel.

FIG. 7C shows a perspective view of a version of the truck system 15 comprised of truck carriage system 50 into which are mounted electric motor, clutch, torque converter 53, rolling stock including second wheel means (carrier and power wheels and axles) 51 and first wheel means (vertical bearing stabilizing wheels and axles) ,54, mechanical equipment 48 and suspension system 16 with suspension arms 60 which are attached to connector housing 63 including connector sleeve 67 via pivot connecting means 61.

FIG. 8 shows a cross sectional view of a version of the transit system with a side mounted truck and a full head room vehicle mounted on the median strip center of the expressway 93 with the transit vehicle 14 running on a structural wide flange beam with a head flange with downward turning ends 27 supported by piers 20. The rolling stock shown here is comprised of a set of second wheel means (power and carrier wheels and axles) 51 which bear downward on bearing rails 31 integrally cast into the top surface of the base flange of the structural wide flange beam 27, forming second track surface 202, and a set of first wheel means (vertical bearing stabilizing wheels) 54 which bear upwards on stabilizing rails 32 integrally cast into on the underside of the head flange of the structural wide flange beam 27, forming first track surface 201, and a set of third wheel means (horizontal bearing stabilizing wheels and axles) 501 bearing onto third track surface 28 of the structural wide flange beam 27. A power and communications means 24 is mounted to the structural wide flange beam 27, The rolling stock is mounted in the truck system 15 comprised of a truck carriage system 50, onto which is mounted suspension system 16 via pivot connecting means 61 on the bottom end of coil spring and dampening shock means 62 and on one end of suspension arms 60 which connect to the top end of the coil spring and dampening shock means 62 at their midpoint via pivot connecting means 61 and are attached at their other ends via pivot connecting means 61 to connector housing 63 which is attached to top mounting block horizontal mount 65, and bottom mounting block 68 (see FIG. 6A for a more detailed veiw of this connection), which are mounted to transit vehicle 14 comprised of vehicle frame 43 constructed with mechanical space for climate control and hydraulics 46, onto which are mounted sliding door system 401 and passenger seats 42 forming the transit compartment with full standing head room 44. The transit system is shown here running in the same diection of travel as the road travel automobiles 94.

FIG. 9 shows a plan of a version of a transit station and switching means for the transit system 10 showing two elements: transit station 121 in which are located fare ticket machines 122, stairs to elevated connecting walkway system 123, elevator to elevated connecting walkway system 124, exit turnstiles 125, cashier 126, entry turnstiles 127, controlled access corridor 128 and holding area 129; switching means 131 operating between primary travelway 132 and secondary travel way 133, with rotating platform 134 including straight track segment 135, curved track segment 136, and point of rotation 137.

MODE OF OPERATION

In the preferred embodiment of the transit system 10 (as shown in FIG. 1), the concept utilizes the space of the median strip and the air space over the median strip 93 emergency lane and a portion of the adjacent travel lane within existing travel route infrastructures by placing the transit system out into the air space over the median strip and a portion of the road travelway. The system takes advantage of existing right-of-ways and minimizes additional land acquisitions for installing the transit systems. The use of said air space enables said transit system 10 to operate on existing expressways and under the overpasses and other improvements which pass over the expressway. The compact height of the transit system allows it to operate under minimum height overpasses while giving clearance for automobile traffic 94 underneath said transit system. The support structure, suspension systems, and the trucks are compacted to a minimum height and connected to the structure in a manner minimizing the overall vertical height. The shape of the transit compartment 40 is equivalent to the space of the interior of an automobile in height so that the passenger while travelling in the vehicle 14 is always in a seated position. Again, this configuration minimizes the vertical dimension required for the function. When the system passes through the existing overpass structures, (shown in FIG. 1) one half of the structural wide flange beam 23 is secured to the existing sidewalls of the overpass. The emergency lane and adjacent driving lane are restricted to vehicles of a set vertical dimension. Suspended under the overpasses, over the travel lane adjacent to the median strip are structural height limiting means and signs stating "TRAVEL LANE FOR AUTOMOBILE USE ONLY" 92. These devices prevent vehicles taller than a set height from utilizing this space. Warnings signs announcing the upcoming lane height restriction are mounted to the structural wide flange beam 21 along the roadway at designated distances from said height restrictions thereby enforcing a transition of large vehicles 95 out of the that lane prior to entering into the height resricited area, while still allowing all traffic to utilize the lane adjacent to the median strip in non-restricted areas.

In the preferred embodiment of the truck under version of the transit system, (shown in FIGS. 2, 3, 4, 4A, and 5) the truck systems 15 are spaced under the vehicle a close lateral distance to allow for turning in a relatively tight radius. All of the weight of the truck is directly transferred vertically to the supporting rails and structure, thereby minimizing the overturning moment forces imposed. The power source for the truck is an electric motor, clutch, torque converter 53 located at one end of the truck system 15 with a drive train to the second wheel means (carrier and power wheels and axles) 51 which run on rails mounted to the top surface of the base flange of the structural wide flange beam 21, forming second track surface 202. The truck system 15 which incorporates the second wheel means (carrier and power wheels and axles) 51 and first wheel means (vertical bearing stabilizing wheels and axles) 54 and brake assembly 58, is designed to fit under the passenger seat 42 of the transit compartment 40, with vehicle frame 43 partially surrounding the extended base flange of the structural wide flange beam 21 so that the vertical dimension of the vehicle, truck, and structure are integrated and compacted, minimizing the vertical dimension (shown in FIG. 3A). This application compacts the vertical dimension of the transit vehicle 14 for use in conditions in which the height clearance is extremely limited. The transit vehicle. 14 of the under truck version can also be configured to have the truck unit 15 incorporated into the structural envelope of the vehicle frame 43 without penetrating into the transit compartment 40 (shown in FIG. 3).

In the preferred embodiment of the transit vehicle 14, the transit compartment 40 of the transit vehicle 14 is configured to have passengers 41 in a seated position in the transit vehicle 14 with head room equivalent to that of an automobile while traveling. The entry side of the vehicle has a vertical arc door system 45 that opens in an upward arc 49 allowing direct access to the transit compartment 40 along the full length of the vehicle 14, alleviating the need for aisleways, and thereby reducing the overall width of the vehicle. Furthermore, the upward arc 49 (shown in FIG. 2) of the vertical arc door system 45 gives full standing head room clearance, allowing the passengers 41 to walk directly into the transit compartment and settle into their seats without having to bend or stoop for loading and unloading at the stations 121. The transit vehicle 14 is controlled by computer operated means (not shown) and has radar sensing means (not shown) to assure clearance of space in front of the transit vehicle 14 and to regulate distances between vehicles traveling on the track system 13. The transit vehicle 14 is also provided with manual operating means (not shown) so that an operator could control the functions of the transit vehicle 14 for servicing and emergency conditions. In addition, the transit compartment 40 is climate-controlled with manually operated vents (not shown) provided for emergency use. Although FIG. 2 shows a two occupant wide transit vehicle, it should be noted that other seating arrangements could allow for variation in volume of traffic by widening the transit vehicle 14, or the transit vehicle 14 could be narrowed to one passenger wide, as shown in FIG. 4B. The profile of the single passenger wide transit vehicle 14 has a sliding door system 47 which raises and slides in a track of matching curve configuration around the transit compartment 40. This single file passenger occupancy also functions well with the passenger 41 turned to face the entry door unit 47, perpendicular to the direction of travel. In either form of this single passenger configuration, a minimal width of the transit system 10 is obtained, thereby also reducing the width of the bottom flange of the structural wide flange beam 21. This configuration is most applicable in conditions where minimal width is a critical factor. The basic concept of the truck under configuration works for both wider and narrower vehicles and the track system 13 could be easily modified to accommodate the various vertical loads.

In the preferred embodiment of the structural support system 12 for the transit system 10, the structural support system 12 for the transit vehicle 14 is installed along the center median strip of a travel route 93 where piers 20 are located at spaced intervals. Spanning between piers 20 are wide flange structural beams with extended base flanges 21, or structural wide flange beam with a head flange with downward turning ends 27, which provide the track system 13 for the transit vehicles 14. The structural wide flange beams 21 and 27 in the median strip are double loaded so that transit vehicles 14 are supported from both sides. The structural wide flange beams 21 and 27 are efficient for long spans between support piers 20 and are effective profiles for resisting lateral forces. In order to reduce the weight of the structural wide flange beams 21 and 27 and to visually lighten the appearance of the structure, voids 26 in the web of the members could be provided (shown in FIG. 3A). The structural wide flange beams 21 and 27 incorporate rail support and guidance elements, forming a composite track system in which the rail sections are an integral part of the structural shape. By having the bearing rails 31, and stabilizing rails 32 incorporated into the structural wide flange beams 21 and 27, the onsite fabrication and erection costs are greatly reduced. The materials of the rails have thermal properties compatible with the structural wide flange beams 21 and 27, thereby eliminating problems of thermal expansion and contraction. The bearing rails 31 and stabilizing rails 32 are constructed of a cast non-metallic material 86 with a non-corrosive, electrically conductive cladding 85, such as stainless steel, overcoming maintenance and deterioration problems common with metal rail systems. The structural wide flange beams 21 and 27 have aligning pins 22 at each end to ensure continuity of alignment of the track system 13. The vertical alignment of the tracks is accomplished with a system of leveling devices (not shown) between the lower surface of the structural wide flange beams 21 and 27 and the vertical piers 20. Metal bearing rails 34 and stabilizing rails 35 (shown in FIG. 4B) could also be attached to the structural wide flange beams 21 and 27 for a more conventional type of construction. Metal bearing rails 34 and stabilizing rails 35 are secured to the structural wide flange beams 21 and 27 by connector means 37 which allow for thermal expansion of the materials. The top surface of the structural wide flange beams 21 and 27 allows the mounting of sign pylons and lighting stantions 25. Power and communication means 24 are mounted to the structural wide flange beam 21 and 27, and power take off means 33 are mounted to the truck system 15. Mounted on the upper surface of the head flange of the structural wide flange beams 21 and 27 could be photo-voltaic panels (not shown) to generate electricity which could be fed into the grid for the local electric utility company. Furthermore, in conditions where the median strip is wide enough, the track system 13 could be placed directly on ground foundations, eliminating the need for the elevating of the transit system.

In the preferred embodiment of the bearing rails 31 and stabilizing rails 32, the above mentioned rails are fabricated out of cast non-metallic material 86 with a thermal expansion and contraction coefficient compatible with the structural wide flange beams 21 and 27. The above mentioned rails are configured with reinforcing center core rods and anchorage bars 87, providing tensile strength and shear resistance. The above mentioned rails are configured with a wheel bearing surface of the rail which is partially covered with non-corrosive electrically conductive cladding 85, such as stainless steel, which is clipped onto the above mentioned rails, mechanically locking into place, and is further attached with a flexible adhesive means, providing a low maintenance wearing surface which resists gouging and deformation. In addition, the cladding 85 could act as the conductor for electrical power means with a respective electrical pickup wheel (not shown) attached to the truck system 15. The preferred method of supplying power or the main load of the motors of the transit vehicles is through the rails utilizing pickup wheel means (not shown), with the lower voltage required for transit vehicle lighting and mechanical systems such as climate control and other power assisted means and systems to be sent through power and communication means 24. To minimize onsite erection time, reduce maintenance and dampen noise, the above mentioned rails are integrated into the casting of the structural wide flange beams 21 and 27, so that these two components become a composite element. The above mentioned rails are exactly positioned in the forming process, assuring dimensional accuracy and alignment. The above mentioned rails are configured with finger jointed spliced ends at the connections of the track sections. A finger jointed connector piece of track is inserted between the two ends of the adjacent track sections, allowing for expansion contraction, and vibration dampening considerations while providing a continuity of bearing surface to provide a smooth ride without telegraphing the joints in the track to the transit vehicle 14.

In the preferred embodiment of the wheel assembly 18, (shown in FIG. 6) noise and wear of the transit system 10 are reduced by three means: friction and noise dampening component 84 provide a bearing surface that is replaceable and of a softer material than the above mentioned rail cladding, extending the life of the track system 13, while dampening the amount of noise and vibration transmitted to the split outer wheel assembly 83; the split outer wheel assembly 83 is isolated from the split inner wheel assembly 81 by vibration dampening component 82 which dampens the amount of noise and vibration transmitted to the split inner wheel assembly 81; the wheel assembly 18 is uniquely large in diameter, offering greater traction and a smoother, quieter ride by distributing its force over a larger bearing surface area as well as allowing high vehicle speeds while maintaining lower axle speeds, reducing wear and maintenance on rolling stock and allowing for the use of smaller, lighter, more efficient, and ecomonical motors with a lower gear ratio to provide the required operational torque.

In the preferred embodiment of the connection system between the transit vehicle 14 and the suspension system 16, (shown in FIG. 6A) said connection system is configured with a connector housing 63 which rotates around a vertical connector pin 66, allowing the suspension system 16 to move independently of the transit vehicle 14 as the truck system 15 follows lateral turns on the path of the track system 13. Said vertical connector pin 66 rotates around top pivot pin 69, allowing the transit vehicle 14 to tilt in the vertical direction as it follows changes in elevation on the path of track system 13 and also to allow the suspension sytstems 16 in each truck system 15, used to support transit vehicle 14, to operate independently as required by varying loading conditions along the length of transit vehicle 14.

In the preferred embodiment of transit station 121, ( shown in FIG. 9) said station is built over expressway 90 and along the route of travel of the transit system 10, utilizing the air space over existing public right-of-ways and infrastructures, thereby incorporating the stations 121 into congested urban areas and eliminating the need for additional land aquisition. The above mentioned stations are configured with primary travelways 132 to allow express vehicles to operate without stopping, while secondary travelways 133 allow vehicles to stop for loading and unloading and servicing. The above mentioned stations are configured on either side of the track system 13 with stairways 123 and elevators 124 to an elevated connecting walkway system (not shown) allowing vehicles to be accessed in both directions. The transit vehicle 14 automatically monitors the number of vacant seats available as it approaches the transit station 121. Passengers exiting from the transit vehicle 14 pass through exit turnstiles 125, adding to the count of seats available. When the last passenger has exited, a platform attendant opens the entry turnstiles 127 which operate on a rotating sequential basis to allow entry only to the number of passengers corresponding to the number of available seats, into controlled access corridor 128. Adjacent to the entry turnstiles 127 is a holding area 129 where passengers could enter and wait should they elect to do so, rather than being separated from travelling companions if the number of seats available is insufficient to accommodate the party. Passengers in holding area 129 have first priority for available seats on the next arriving transit vehicle.

In the preferred embodiment of the switching means 131 (shown in FIG. 9), said switching means is used for moving the transit vehicle 14 from the primary travelway 132 to the secondary travelway 133 for loading/unloading in transit stations, traveling onto secondary routes, and into service areas. For switching from the primary travelway 132 to a secondary travelway 133, a rotating platform 134 turns, removing straight track segment 135 from the primary travelway 132 and inserting curved track segment 136 forming a continuous path to the secondary travelway 133. The straight track segment 135 and the curved track segment 136 are positioned a sufficient horizontal distance away from one another so as to allow for vehicle clearance.

In the preferred embodiment of the side mounted truck version (shown in FIGS. 7, 7A, 7B, 7C, and 8) the truck system 15 is mounted to the side of the vehicle frame 43 via the top mounting block, horizontal mount 65 and bottom mounting block 68. In this configuration, the vehicle frame 43 does not have to be structured around trucks and support structure, allowing the vehicle frame 43 to be continuous and greatly simplified.

The transit vehicle 14 used in the preferred embodiment of the side mounted truck version (shown in FIG. 7, 7A, 7B, 7C and 8) as is described for the truck under version.

The truck sysrem 15 and the suspension system 16 used in the preferred embodiment of the side mounted truck version is as described above for the truck under version with the exception of the use of top mounting block—horizontal mount 65 in place of top mounting block—vertical mount 64 in the connection system 16 (see FIG. 6A for a more detailed view).

The structural support system 12 and track system 13 used in the preferred embodiment of the side mounted truck system are as described above for the truck under version with the exception that there are only two sets of rails as opposed to three sets of rails. The side mounted truck system utilizes the opposing bearing of the wheel systems in the vertical plane to overcome the moment forces imposed by the transit vehicle 14.

In the preferred embodiment of the full head room vehicle version (shown in FIG. 8) a transit vehicle allowing for standing head room is used in conditions where overpasses are built sufficiently high over the expressway, providing adequate air space. Many of the newer overpass infrastructures provide sufficient height clearance to allow for clearance of the full head room height vehicles, whereas the compact vertical height transit vehicle has greater utility in applications with existing and/or older overpass infrastructures with less vertical height clearance. The full head room vehicle utilizes a side mount truck as is described in the preferred embodiment of the side mount truck version above, but of an increased size. The structural wide flange beam of this application is also similar to the above description, but of an increased size, and the head flange is extended and has downward turning ends 27. The third track surface 28, which is the interior surface of the downturned end, provides bearing for third wheel means (horizontal bearing stabilizing wheels and axles) 501. Said horizontal bearing stabilizing wheels and axles being utilized to resist the lateral forces and live loads acting on the system. The door sytem for the full height transit system consists of sliding doors 401 mounted in the access side wall plane.

The preferred embodiment of the present invention includes many advantages over existing transit systems, greatly reducing fabrication, erection, and operating costs as well as environmental, visual, and noise level impact on the community, while providing a comfortable, conveniently located and frequently running transit system. The system is designed as a comprehensive system of structure, trucks, vehicles, and stations, all of which are integrated within existing public transportation and utility infrastructure. This system utilizes transit stations mounted over routes of travel, reducing the need for extra land acquisition, providing convenient locations and placing the stations in direct route with the transit system. Small-scale structural trackways and pier supports which are cost and time efficent to manufacture and install, support light weight, compact vehicles having seated position head room equivalent to that of an automobile, and a door system which provides full walk-in head room for loading and unloading. Vehicles are mounted to the track system by means of trucks which are designed with a unique suspension system and connector means, providing a smooth, comfortable ride. Noise and vibration dampening devices within the wheel assembly and the bearing surfaces of the rails reduce the vibration and noise impact of the system. Computerized programming of the system's operations further reduce operational costs by reducing necessary manpower. Maintenance costs are reduced by the vehicles' detachable means and interchangable parts, and efficient servicing, as ground operated vehicles can drive and park along existing travel routes, gaining direct access to the system for repairs.

The present invention capitalizes on a less in size/more frequent scheduling concept by utilizing smaller stations, smaller equipment, a smaller structural system, with more vehicles running more frequently allowing for a system with more flexibility and diversity, lower cost, ease of construction, and less negative community impact while providing an efficient commuting system.

Though the present invention has been outlined to pertain specifically to a transit system, it should be understood that the system and the individual components outlined therein could be used in many applications, such as but not limited to, industrial, commercial, private, and recreational usage. In addition, the preferred embodiment as outlined in the above specification places the system within an existing expressway condition. It should be understood that the utiization of the expressway in the embodiment is for clarity only, and the system's utility extends beyond the condition of expressways, to other routes of travel such as but not limited to secondary roadways, railways, waterways, public right of ways, and utility easements.

It should now be apparent that the transit system described above possesses unique attributes as set forth in the summary of the invention. Because the system can be modified to some degree without departing from the principles as they have been outlined and explained in this specification, this invention shoud be understood to encompass all such modifications as fall within the scope and spirit of the following claims.

I claim:

1. A transit system including a suspended, elevated elongated rail means having downwardly and upwardly facing first and second upper and lower track surface means, at least one elongated transit vehicle mounted on said rail means for movement therealong, said transit vehicle including truck means spaced therealong, each truck means including upper and lower wheel means journalled therefrom rollingly engaged with said first and second track surface means, a vehicle frame, suspension means having upper and lower generally horizontal parallel cantilever suspension arms including one pair of corresponding ends pivoted from said truck means for angular displacement about first axes transverse to said arms and generally paralleling the longitudinal extent of said vehicle and a second pair of ends from which upper and lower portions of said vehicle frame are supported for angular displacement about second axes generally paralleling said first axes, and spring means operatively connected between said truck means and suspension arms yieldingly urging said second pair of arm ends upwardly against the weight of said vehicle frame and body and passenger weight supported therefrom.

2. The transit system of claim 1, wherein each transit vehicle includes a transit compartment configured for passengers in a seated position with the height of transit vehicle compacted while traveling and each said transit vehicle having portions of an upstanding access wall thereof and contiguous roof panel movable by power assisted means providing for full standing head room height with walk in access.

3. The transit system of claim 1, wherein said track is comprised of a cast material having a reinforced core and anchorage means, said wheel means including outer peripheral surfaces clad with non-corrosive electrically conductive material.

4. The transit system of claim 1 wherein said upper and lower wheel means include a pair of inner and outer axially spaced lower wheel means and said upper wheel means is generally centered above said inner lower wheel means.

5. The transit system of claim 1 wherein each truck means includes front and rear pairs of upper and lower wheel means.

6. The transit system of claim 1 wherein said track surface means include track rails and said wheel means include flanged wheels rollingly engaged with the corresponding track rails.

7. The transit system of claim 1 including shock dampening means operatively associated with said spring means and also connected between said truck means and suspension arms.

8. The transit system of claim 1 wherein said inner upper and lower outer wheel means are arranged in tandem relation to one another; said rail means also including inwardly facing upper surface means extending longitudinally therealong, and guide wheels journalled from said truck means for rotation about upstanding axes and rollingly engaged with said inwardly facing surface.

9. The transit system of claim 1 wherein said truck means has motor means, said suspension means and said wheel means thereof positioned in a linear configuration generally parallel to said elongated rail means.

10. The transit system of claim 1 wherein said second track surface means includes a guide rail on said upward facing surface and guide wheel means journaled from said truck means disposed in lateral rolling engagement therewith.

11. The transit system of claim 1 including pivot means pivotally mounting said truck means, each, from said transit vehicle for oscillation relative thereto about an upstanding axis.

12. The transit system of claim 1 wherein said elongated rail means includes longitudinally spaced portions thereof which laterally split to form two separate single sided rail means and then laterally merge together to again form said elongated rail means.

13. The transit system of claim 1 wherein said upper and lower wheel means offset with respect to one another in a horizontal plane.

14. The transit system of claim 1 wherein at least one of said wheel means includes an inner journaled wheel assembly and an outer annular wheel assembly mounted on the outer periphery of said inner wheel assembly through the use of an intermediate annular vibration dampening component, said outer wheel assembly including an outer periphery from which an outer annular further vibration dampening component is mounted thereto.

15. The transit system of claim 1 wherein said vehicle includes a transit compartment configured for passengers in a seated position and a door system closing said compartment from above and on one side thereof, said door system being mounted from said vehicle for movement to an out of the way position opening said one side of said compartment thereby at least substantially increasing the head room thereof.

\* \* \* \* \*